United States Patent
Ha

(10) Patent No.: US 10,571,694 B2
(45) Date of Patent: Feb. 25, 2020

(54) OPTICAL APPARATUS

(71) Applicant: Jeong Hun Ha, Seoul (KR)

(72) Inventor: Jeong Hun Ha, Seoul (KR)

(73) Assignee: LETINAR CO., LTD, Seoul (KR)

( * ) Notice: Subject to any disclaimer, the term of this patent is extended or adjusted under 35 U.S.C. 154(b) by 0 days.

(21) Appl. No.: 15/557,805

(22) PCT Filed: Nov. 14, 2016

(86) PCT No.: PCT/KR2016/013097
§ 371 (c)(1),
(2) Date: Sep. 13, 2017

(87) PCT Pub. No.: WO2018/048018
PCT Pub. Date: Mar. 15, 2018

(65) Prior Publication Data
US 2018/0292652 A1 Oct. 11, 2018

(30) Foreign Application Priority Data
Sep. 8, 2016 (KR) .......... 10-2016-0115900

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0179* (2013.01); *G06T 19/00* (2013.01); *G02B 17/006* (2013.01); *G02B 27/0075* (2013.01); *G02B 27/0149* (2013.01); *G02B 2027/0127* (2013.01); *G02B 2027/0185* (2013.01)

(58) Field of Classification Search
CPC ............ G02B 27/0101; G02B 27/0172; G02B 2027/0118; G02B 2027/0178; G02B 2027/0123; G02B 2027/013; G02B 2027/011; G02B 27/017; G02B 27/0149; G02B 2027/015; G02B 2027/014;
(Continued)

(56) References Cited

U.S. PATENT DOCUMENTS

| 2004/0080467 A1* | 4/2004 | Chinthammit .......... G06F 3/011 345/7 |
| 2007/0153395 A1* | 7/2007 | Repetto .............. G02B 17/0856 359/630 |

(Continued)

FOREIGN PATENT DOCUMENTS

| KR | 10-2013-0126623 A | 11/2013 |
| KR | 10-1524933 B1 | 6/2015 |

(Continued)

*Primary Examiner* — William R Alexander
*Assistant Examiner* — Sharrief I Broome
(74) *Attorney, Agent, or Firm* — Rabin & Berdo, P.C.

(57) ABSTRACT

The present invention relates to an optical apparatus with a wide available range of a lens module, which is capable of providing an image having a deep depth of field to a user. The optical apparatus according to the present invention includes a display unit for outputting an image; at least one reflective unit having a size of 4 mm or less for reflecting the image outputted from the display unit; and a frame unit fixed thereto with the display unit and the at least one reflective unit.

6 Claims, 13 Drawing Sheets

(51) Int. Cl.
  *G02B 17/00* (2006.01)
  *G02B 27/00* (2006.01)
(58) Field of Classification Search
  CPC ............ G02B 2027/0138; G02B 27/01; G02B 27/0176; G02B 5/30
  See application file for complete search history.

(56) References Cited

U.S. PATENT DOCUMENTS

| | | | | |
|---|---|---|---|---|
| 2012/0127062 | A1* | 5/2012 | Bar-Zeev | G02B 3/14 345/6 |
| 2014/0347252 | A1* | 11/2014 | Miyawaki | G02B 27/017 345/8 |
| 2015/0168730 | A1* | 6/2015 | Ashkenazi | G02B 27/0172 359/631 |
| 2015/0362735 | A1* | 12/2015 | Akutsu | G02B 5/09 359/13 |
| 2018/0149869 | A1* | 5/2018 | Bergquist | G02B 27/147 |

FOREIGN PATENT DOCUMENTS

| | | |
|---|---|---|
| KR | 10-2015-0116142 A | 10/2015 |
| KR | 10-1646873 B1 | 8/2016 |
| WO | WO-2014009717 A1 * | 1/2014 ............... G02B 6/00 |

* cited by examiner

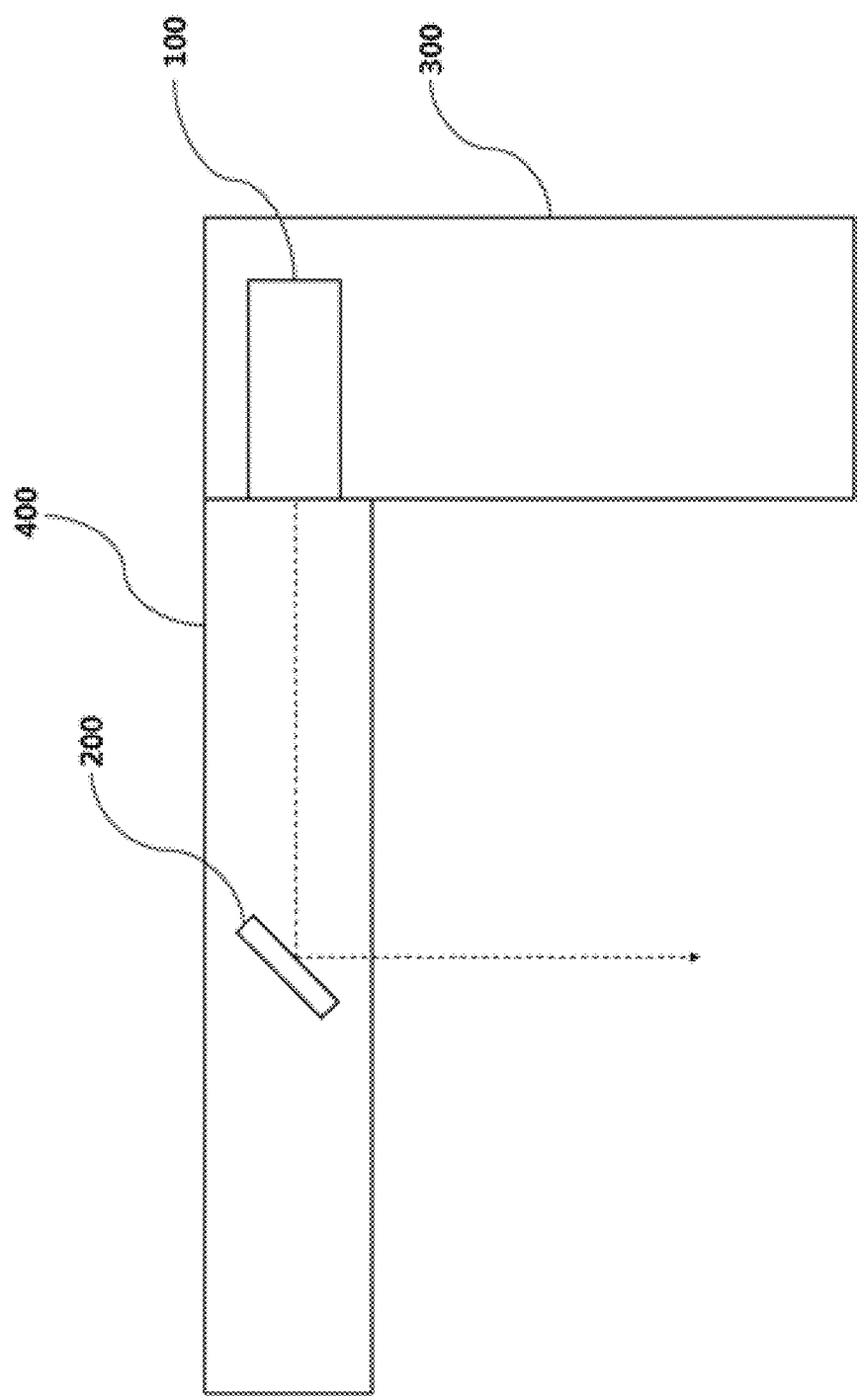

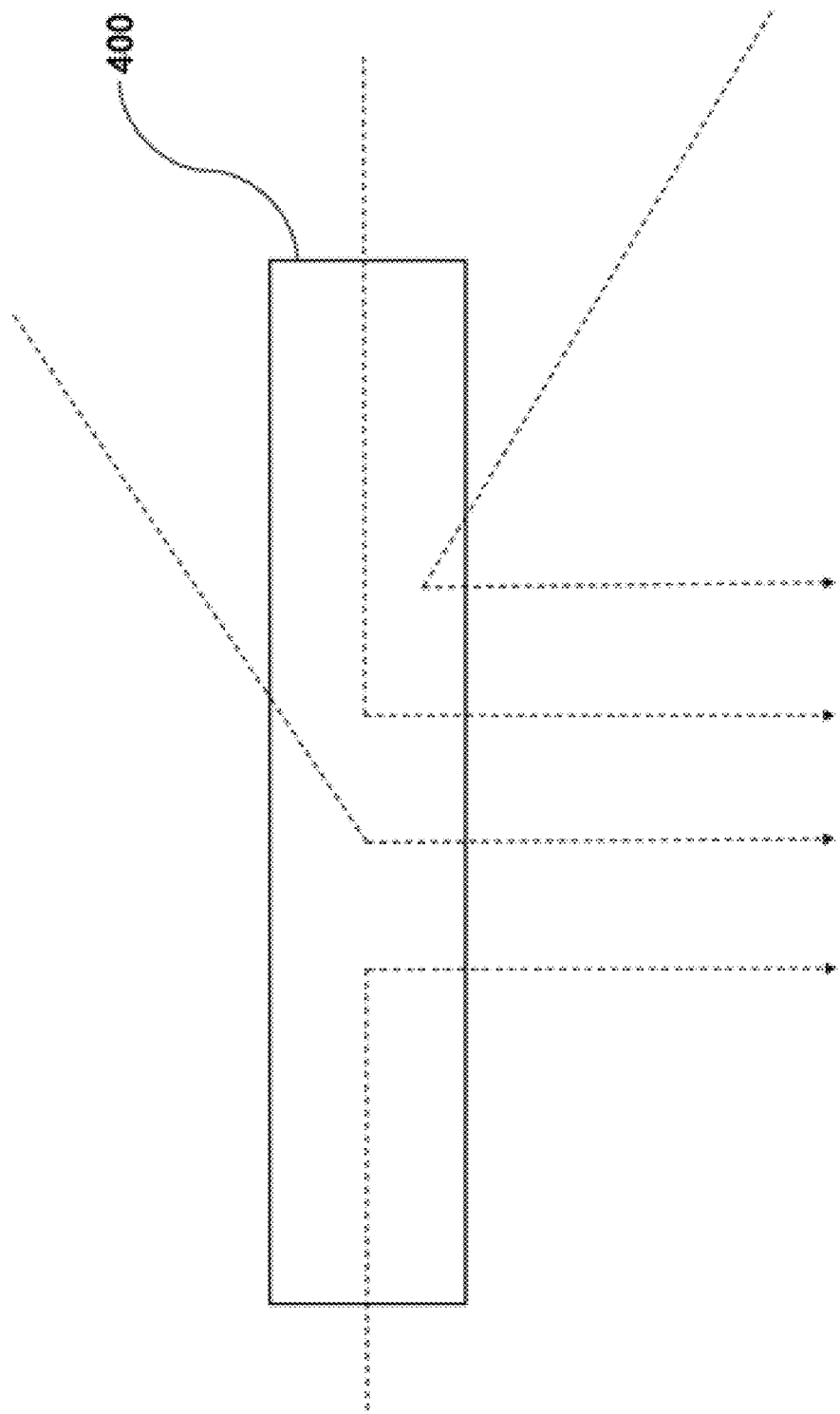

OPTICAL APPARATUS

CROSS-REFERENCE TO PRIOR APPLICATIONS

This application is a national Stage Patent Application of PCT International Patent Application No. PCT/KR2016/013097, filed on Nov. 14, 2016 under 35 U.S.C. § 371, which claims priority of Korean Patent Application No. 10-2016-0115900, filed on Sep. 8, 2016, which are all hereby incorporated by reference in their entirety.

BACKGROUND OF THE INVENTION

1. Field of the Invention

The present invention relates to an optical apparatus using reflection, refraction, or diffraction, and more specifically, to an optical apparatus for providing an image with a deep depth of field to a user and having a wide available range of an optical module included in the optical apparatus.

2. Description of the Related Art

An augmented reality (AR) is a technology for enabling a user to see a virtual screen (virtual world) superimposing a real world which the user sees with eyes. The AR has been called a mixed reality in the early stage because a single image is displayed by combining the real world with the virtual world having additional information in real time.

The AR has begun to be studied starting with the development of a see-through head mounted display (HMD), the AR has a meaning different from a virtual reality (VR). Whereas the user cannot see the actual environment because the VR leads the user to be immersed in a virtual environment, the AR allows the user to see the actual environment, and has the form of mixing the actual environment with a virtual object. In other words, there is a difference in that the VR shows the virtual world to the user by replacing the real world, however, the AR shows the real world to the user by supplementing the real world by superimposing the virtual object on the real world.

In order to realize the above AR, the HMD is mainly used, however, a lens module (an optical system module) of the HMD has a problem in that it is very difficult to manufacture due to its complicated structure, and the lens module has a large size and heavy weight due to the complicated structure.

As one of apparatuses for implementing the conventional augmented reality, 'Patent Document 1 (KR 10-1646873 B1)' discloses a head mounted display device having a rotational hinge structure in a goggle module. The head mounted display device having a rotational hinge structure in a goggle module of Patent Document 1 has a technical feature of having a hinge structure to view the virtual screen only by moving eyeballs up and down while fully securing the external view.

Patent Document 2 (KR 10-1524933 B1) discloses an optical system and a head mounted display apparatus for augmented reality implementation. The optical system and the head mounted display apparatus for the augmented reality implementation include: a first reflective unit for transmitting a first image which is a part of the real image and changing an optical path of a second image which is a remaining part so as to minimize the deviation when a virtual image (virtual screen) is matched with a real image (external view); a second reflective unit for re-changing the optical path of the second image; an image collection unit for collecting the second image; a controlling unit for generating the virtual image based on the second image, and enabling the virtual image to be outputted from a display panel; an enlarging lens unit for enlarging the virtual image outputted from the display panel; and a third reflective unit for enabling the virtual image enlarged through the enlarging lens unit to be imaged on a retina of a user.

Due to the above structural problems, the conventional apparatus for implementing the augmented reality including 'Patent Document 1' and 'Patent Document 2' has a problem that the number of lens modules, the arrangement form of the lens module, and the arrangement form of the display module (device) are very limited.

In addition to the above problem, there is a problem in that the conventional lens module fails to provide the user with a constantly clear virtual screen although the conventional apparatus for implementing the augmented reality has a complicated structure.

As described above, the AR is the technology for superimposing the virtual screen so as to enable the user to simultaneously recognize the virtual screen when the user recognizes the real world. When the user recognizes (looks at) the real world, if the user focuses on where the user wants by focusing on a far or near distance (if the user changes a focal distance), the virtual screen may look blurry or clear. In other words, because the focus of the lens module for providing (reflecting) the virtual screen is fixed, the user may see the clear virtual screen only when the focus is in while changing the focal distance, however, the user sees the blurred (unclear) virtual screen when it is out of focus.

As one of conventional arts to solve the above problems, Patent Document 3 (KR 10-2015-0116142) discloses a focus-adjustable optical system module for a head mounted display. More specifically, the focus-adjustable optical system module for a head mounted display of Patent Document 3 includes: a screen transfer lens for receiving a virtual screen from a display panel, total-internal-reflecting the received virtual screen, and transferring the virtual screen to a next optical system; an adjusting prism for receiving the virtual screen transferred from the screen transfer lens, and adjusting the focus through reflecting the virtual screen by adjusting an angle so as to transfer the virtual screen to the next optical system; and a combiner for reflecting the virtual screen transferred from the adjusting prism and combining the real screen from the outside so as to transfer the combined screen to wearer's eyes.

The focus-adjustable optical system module for the HMD of Patent Document 3 is capable of a focus adjustment. However, the focus adjustment refers to that the user adjusts the focus and focuses on (fixes) one of views at which the user mainly looks, and it totally fails to solve the problem pointed out above in that the user obtains the unclear virtual screen when changing the focal distance while gazing at the real world.

In addition, as one of conventional arts to solve the above problems, Patent Document 4 (KR 10-2013-0126623 A) discloses an augmented reality system and a method of providing an improved focus. More specifically, the augmented reality system and the method of providing the improved focus of Patent Document 4 include: a processor for determining a current user focus area under control of software; and a focus area adjustment unit for focusing a variable focus lens within the current user focus area under control of the processor. The augmented reality system and the method of providing the improved focus of Patent Document 4 totally fail to solve the above problems in view of a physical scheme. Because an additional processor is required to determine the current user focus area and additional software is required to control the processor, the software and processor may have malfunctions and errors.

Further, the manufacturing cost is high due to the additional installation of the processor and software.

SUMMARY OF THE INVENTION

The present invention is disclosed to solve the above-described problems and necessities. An object of the present invention is to provide an optical apparatus, in which the reflective unit for reflecting the image outputted from the display unit is miniaturized, so that the number of reflective unit and the available range of the arrangement are increased, and the number of the display unit and the available range of the arrangement are increased, and simultaneously, an image having a deep depth of field can be provided to the user.

The configuration of the present invention for realizing the above object of the present invention and implementing the effect of the present invention is as follows.

The optical apparatus according to the present invention includes: a display unit for outputting an image; at least one reflective unit having a size of 4 mm or less for reflecting an image outputted from the display unit; and a frame unit to which the display unit and the at least one reflective unit are fixed.

In addition, the present invention may further include an auxiliary optical unit installed thereon with the at least one reflective unit and the auxiliary optical unit may be fixed to the frame unit.

In addition, the auxiliary optical unit includes a transparent optical element to transmit the visible rays, and the at least one reflective unit may be installed outside or inside the auxiliary optical unit.

In addition, the display unit may be fixed to the frame unit and installed on a side surface of the auxiliary optical unit.

In addition, the at least one reflective unit may be buried inside the auxiliary optical unit.

In addition, the auxiliary optical unit may be formed of an opaque optical element for preventing the visible rays from being transmitted, and the at least one reflective unit may be installed outside or inside the auxiliary optical unit.

In addition, the present invention may further include at least one of a refractive optical element for refracting the image outputted from the display unit, a reflective optical element for reflecting the image outputted from the display unit, and a diffractive optical element for diffracting the image outputted from the display unit.

In addition, the side surface of the auxiliary optical unit may be curved, so that the image outputted from the display unit is refracted at the side surface of the auxiliary optical unit.

In addition, the at least one reflective unit may be formed of a metal.

In addition, the at least one reflective unit may be formed of an optical element.

In addition, the at least one reflective unit may be formed in an edgeless shape.

In addition, the at least one reflective unit may be formed in a circular or oval shape.

In addition, a surface of the at least one reflective unit may be formed in a curved shape.

Due to the above configuration, the optical apparatus according to the present invention is configured to miniaturize the reflective unit, so that the number of the reflective unit and the available range of the arrangement are increased, and the number of the display unit and the available range of the arrangement can be increased. In other words, according to the present invention, the degree of freedom for the number of installation and installation position of the reflective unit and the display unit can be remarkably improved.

In addition, according to the optical apparatus of the present invention, the entire configuration of the optical apparatus can be remarkably simplified due to the above configuration. In addition, the weight of the optical apparatus can be lighter, the volume can be smaller, and manufacturing costs can be reduced.

In addition, the optical apparatus according to the present invention can provide an image having a deep depth of field to the user. Accordingly, when the user look at the real world, a clear image can be always obtained regardless of the focal distance even if the user adjusts the focal distance.

In addition, the optical apparatus according to the present invention enables the user to obtain a clear image regardless of the user's eyesight due to the above configuration.

BRIEF DESCRIPTION OF THE DRAWINGS

FIG. 1 is a schematic view showing the configuration of an optical apparatus according to one embodiment of the present invention.

FIGS. 3 and 4 are views describing an effect of an optical apparatus according to the present invention.

DETAILED DESCRIPTION OF THE INVENTION

Figure 2A:
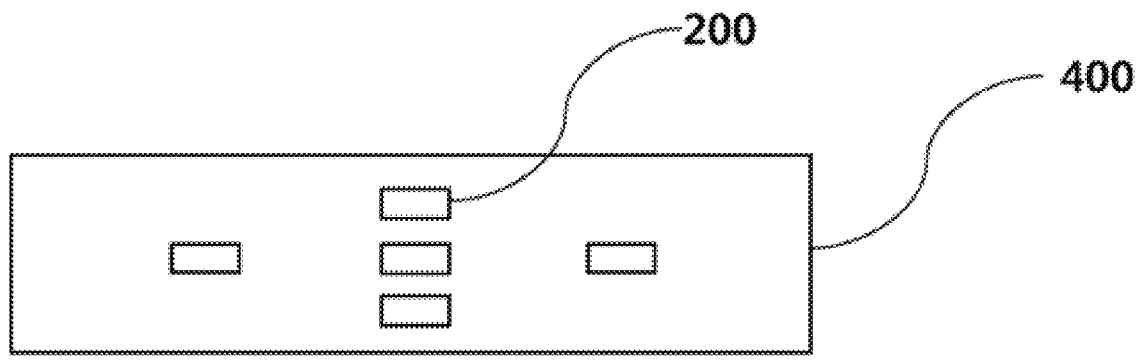
FIGS. 2A and 2B are schematic views showing the configuration of an optical apparatus according to another embodiment of the present invention.

The following detailed description of the invention refers to the accompanying drawings for illustrating specific embodiments by way of example in which the invention may be carried out. The embodiments are described in detail enough to enable those skilled in the art to carry out the invention. It should be understood that the various embodiments of the present invention may be different from each other but does not need to be mutually exclusive. For example, the particular shapes, structures, and features described herein may be embodied in other embodiments without departing from the idea and scope of the invention in connection with one embodiment. In addition, it should be understood that the location or arrangement of an individual element within each disclosed embodiment may be modified without departing from the idea and scope of the present invention. Accordingly, the following detailed description is not intended to disclose a limited meaning, and the scope of the invention is limited only by the appended claims, along with the full scope of equivalents to which the claims are entitled, if properly explained. Similar reference numerals in the drawings refer to the same or similar function throughout several aspects.

The terms including an ordinal number such as first and second may be used to describe various elements, however, the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

Meanwhile, the term used herein is just for the purpose of describing a particular embodiment and is not intended to limit the invention. The singular expression includes a plural expression unless the context clearly means otherwise. In addition, it should be understood that the term such as "include" and "have" in the present invention is intended to designate the presence of feature, number, operation, element, component, or the combination thereof recited in the specification, which does not preclude the possibility of the presence or addition of one or more other features, numbers, steps, operations, elements, components, or combinations thereof.

Unless otherwise defined, all terms used herein including technical or scientific terms have the same meaning as commonly understood by those having ordinary skill in the art. Terms such as those defined in generally used dictionaries should be interpreted to have the meaning consistent with the meaning in the context of the related art, and it should not be interpreted as an ideal or excessively formal meaning unless expressly defined in the present invention.

Hereinafter, preferred embodiments of the present invention will be described in detail with reference to the accompanying drawings, so that the present invention may be easily carried out by those having ordinary skill in the art.

FIG. 1 is a schematic view showing the configuration of an optical apparatus according to one embodiment of the present invention. Referring to FIG. 1, the optical apparatus according to the present invention includes: a display unit 100 for outputting an image; at least one reflective unit 200 having a size of 4 mm or less for reflecting the image outputted from the display unit 100; and a frame unit 300 to which the at least one reflective unit is fixed. In addition, an auxiliary optical unit 400 installed thereon with the at least one reflective unit if necessary may be further included.

FIG. 1 is for the purpose of comprehension of the present invention and the display unit 100 and the reflective unit 200 are expressed somewhat differently from the proportion according to the actual sizes. For example, because the size of the reflective unit 200 is 4 mm or less, the size thereof is very small to be identified by naked eyes. In addition, the reflective unit 200 may be small to be rarely recognized visually by naked eyes if necessary. Accordingly, the size of the reflective unit 200 is slightly exaggerated to facilitate understanding of the present invention.

The display unit 100 refers to a component for outputting an image, and a size, a type, and a shape of the display unit 100 are not limited as long as the display unit 100 outputs various types of images (which is a concept that includes all the visual factors and includes both a still image and a moving image). On the contrary, according to the present invention, the size or installation position (arrangement) of the display unit 100 may be set very freely by the following feature of the reflective unit 200.

The reflective unit 200 reflects an image outputted from the display unit 100, and it is preferable that the reflected image is configured to reach the user's eyes. In addition, the size of the reflective unit 200 is preferably 4 mm or less. The size of the reflective unit 200 is configured to be smaller than the size of a human pupil. The size of the human pupil is generally known to be 2 mm to 6 mm. Because the pupil has a different size for each person, it is preferable that the size of the reflective unit 100 is equal to or less than 4 mm which is the average size of the human pupils.

In addition, the reflective unit 200 may have a size of 2 mm or less. Because the size of the human pupil is generally known to be 2 mm to 6 mm, the reflective unit 200 may be formed smaller than the human pupil at any time when the size of the reflective unit 100 is formed to 2 mm or less.

In addition, preferably, the reflectance of the reflective unit 200 is 100%, for this end, the reflective unit 200 may be formed of a metal. For example, the reflective unit 200 may be formed of aluminum (Al) or silver (Ag), otherwise, various kinds of metals, alloys or synthetic resins also may be used.

In addition, the reflective unit 200 may be formed of optical elements having various materials. For example, the reflective unit 200 may be formed of a holographic optical element, so that diffraction grating reflection is implemented, in which the image, which the user obtains, has a holographic form. In addition, other types of elements other than the holographic optical element may be used, so that the diffraction grating reflection is implemented.

Figure 2B:
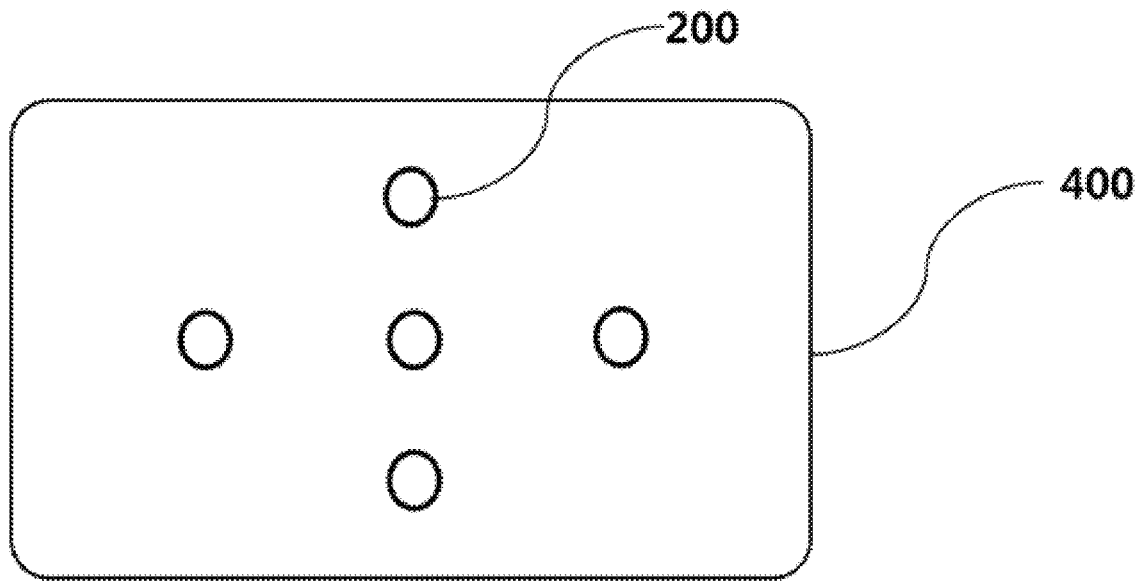

FIGS. 2A and 2B are schematic views showing the configuration of an optical apparatus according to another embodiment of the present invention. The optical apparatus according to the present invention may include at least one reflective unit 200 having the above features. FIGS. 2A and 2B show states of the reflective unit 200 installed in the auxiliary optical unit 400, in which FIG. 2A shows a state of the auxiliary optical unit 400 viewed from an upper side thereof, and FIG. 2B shows a state of the auxiliary optical unit 400 viewed from a front thereof.

In other words, the present invention may include one reflective unit 200 or more than one reflective units 200 if necessary. When more than one reflective units 200 are included, each of the reflective unit 200 reflects each image from the display unit 100 (herein, two or more display units 100 may be included) to allow the user to obtain various images. In addition, a plurality of reflective units 200 may form a group, and several groups may be formed if necessary.

The reflective unit 200 may be installed inside or outside the auxiliary optical unit 400. For example, as shown in FIG. 1, the reflective unit 200 may be buried (dented) inside the auxiliary optical unit. On the contrary, the reflective unit 200 may be attached to a front surface or a rear surface of the auxiliary optical unit 400.

The frame unit 300 refers to an element for fixing at least one reflective unit 200, and the frame unit 300 may be directly connected to the reflective unit 200 so as to fix the reflective unit 200. In addition, when the auxiliary optical unit 400 is further included, the frame unit 300 fixes the auxiliary optical unit 400, and the frame unit 300 may indirectly fix the reflective unit 200 in a form that the reflective unit 200 is installed in the auxiliary optical unit 400.

Herein, the frame unit 300 may be a user-wearable head mount device of glasses shape or other various shapes. Alternatively, it may have various shapes.

The auxiliary optical unit 400 refers to a component to which the at least one reflective unit 200 is installed, and the auxiliary optical unit 400 may be fixed to the frame unit 300. The auxiliary optical unit 400 may include a transparent optical element to transmit the visible rays, and may be formed of an opaque optical element for preventing the visible rays from being transmitted.

When the auxiliary optical unit 400 is formed of the transparent optical element, the optical apparatus according to the present invention may be used as an optical apparatus for the augmented reality. As described above, the augmented reality is a technology for enabling the user to see a virtual screen superimposing a real world which the user sees with eyes. The user of the optical apparatus using the reflective lens module according to the present invention may recognize the real world through the transparent auxiliary optical unit 400, and simultaneously, may recognize the image (virtual screen) reflected on the reflective unit 200 (see-through).

On the contrary, when the auxiliary optical unit 400 is formed of the opaque optical element or the auxiliary optical unit 400 is formed of an optical element for reducing or blocking an external view of the user, the optical apparatus according to the present invention may be used as an optical apparatus for the virtual reality (see-closed). In this case, a separate display unit 300 may also be installed in the auxiliary optical unit 400 to output a separate image.

It is preferable that the auxiliary optical unit 400 according to the present invention has 100% of the transmittance of the visible rays to enable the user to clearly see the real world, however, the auxiliary optical unit 400 may be configured by selecting the transmittance of the visible rays according to a state of the user's eye (eyeball) or the application to be used.

In addition, when it is required to block ultraviolet rays (UV), the auxiliary optical unit 400 may be configured to block the ultraviolet rays and transmit the visible rays. When an eyesight correction is necessary due to the user's bad eyesight, an eyesight correction lens may be used.

The auxiliary optical unit 400 may be mainly formed of a glass, or may be formed of various kinds of plastics other than the glass.

Figure 4:
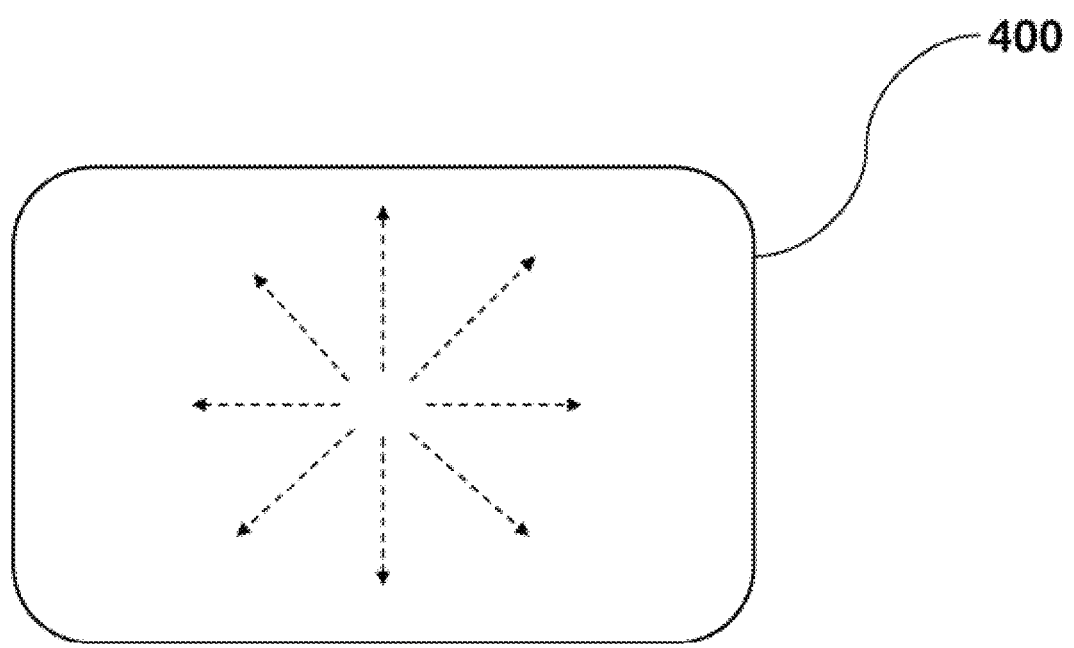
Figure 6:
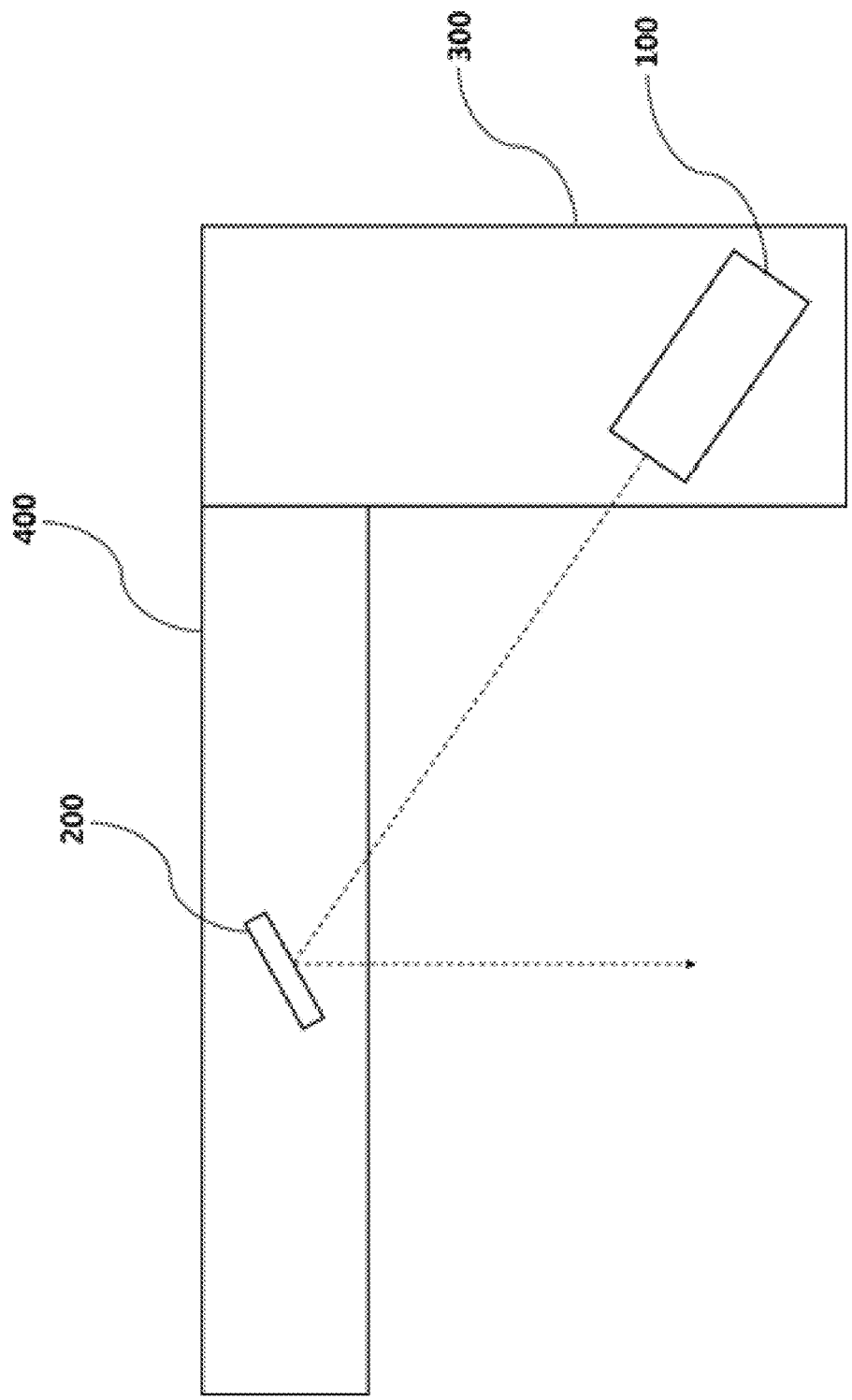

FIG. 3 and FIG. 6 are views describing an effect of the optical apparatus according to the present invention, in which FIG. 3 shows a path of an image starting from the display unit 100 and viewed above the auxiliary optical unit 400, and FIG. 4 shows a path of an image starting from the display unit 100 and viewed in front of the auxiliary optical unit 400. The expression of the reflective unit 200 is omitted in FIG. 3 and FIG. 4 to facilitate understanding of the invention.

Due to the above feature of the reflective unit 200, the optical apparatus according to the present invention enables the reflective unit 200 to be set very freely in an installation angle, in which FIG. 3 and FIG. 4 show various paths of the images.

Thus, according to the present invention the optical apparatus of the present invention, the installation position of the display unit 100 may be set very freely. First, referring to FIG. 1, it is confirmed that the reflective unit 200 may reflect the image to eyes of the user even if light (image) is transferred from a side surface of the auxiliary optical unit 400 to the reflective unit 200 through the display unit 100. Herein, the 'side surface' of the auxiliary optical unit 400 refers to upper, lower, left, and right side surfaces, and it is not limited to the left and right side surfaces in the drawing.

Figure 5:
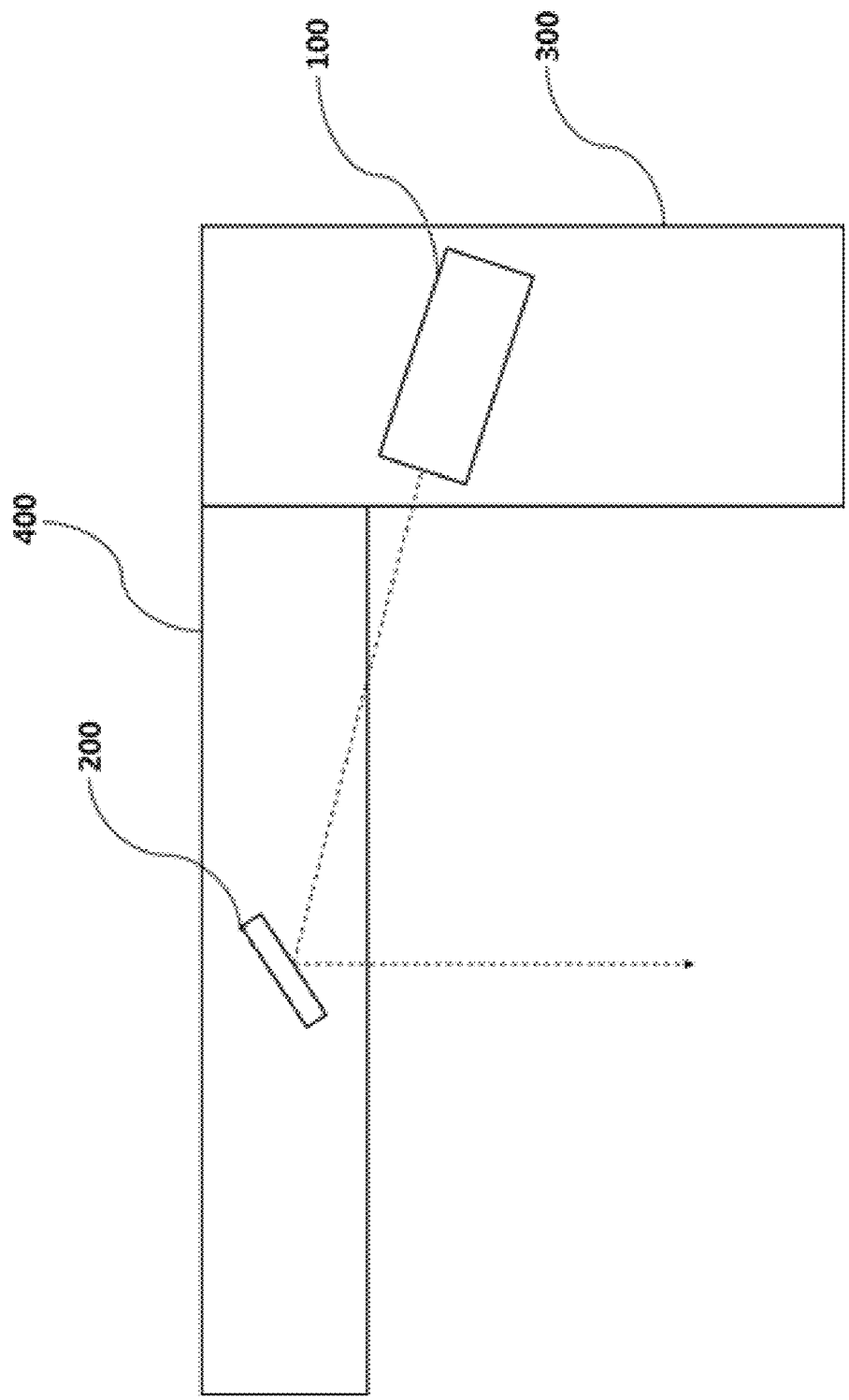
FIGS. 5 to 9 are schematic views showing configurations according to another embodiment of the optical apparatus according to the present invention.

FIG. 5 and FIG. 6 show schematic views showing the configuration of an optical apparatus according to another embodiment of the present invention. Referring to FIG. 5 and FIG. 6, it is confirmed that the display unit 100 may be installed at various positions of the frame unit 300.

Figure 7:
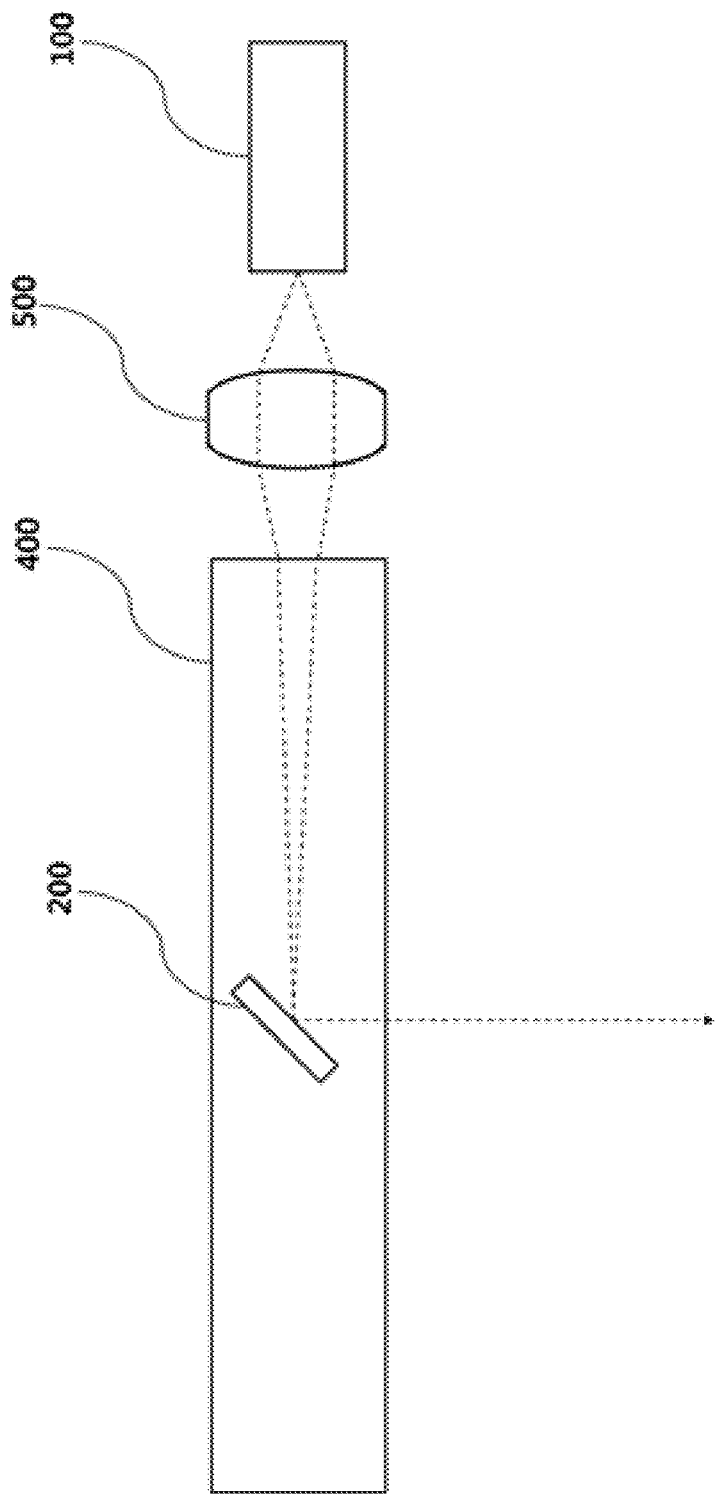
Figure 8:
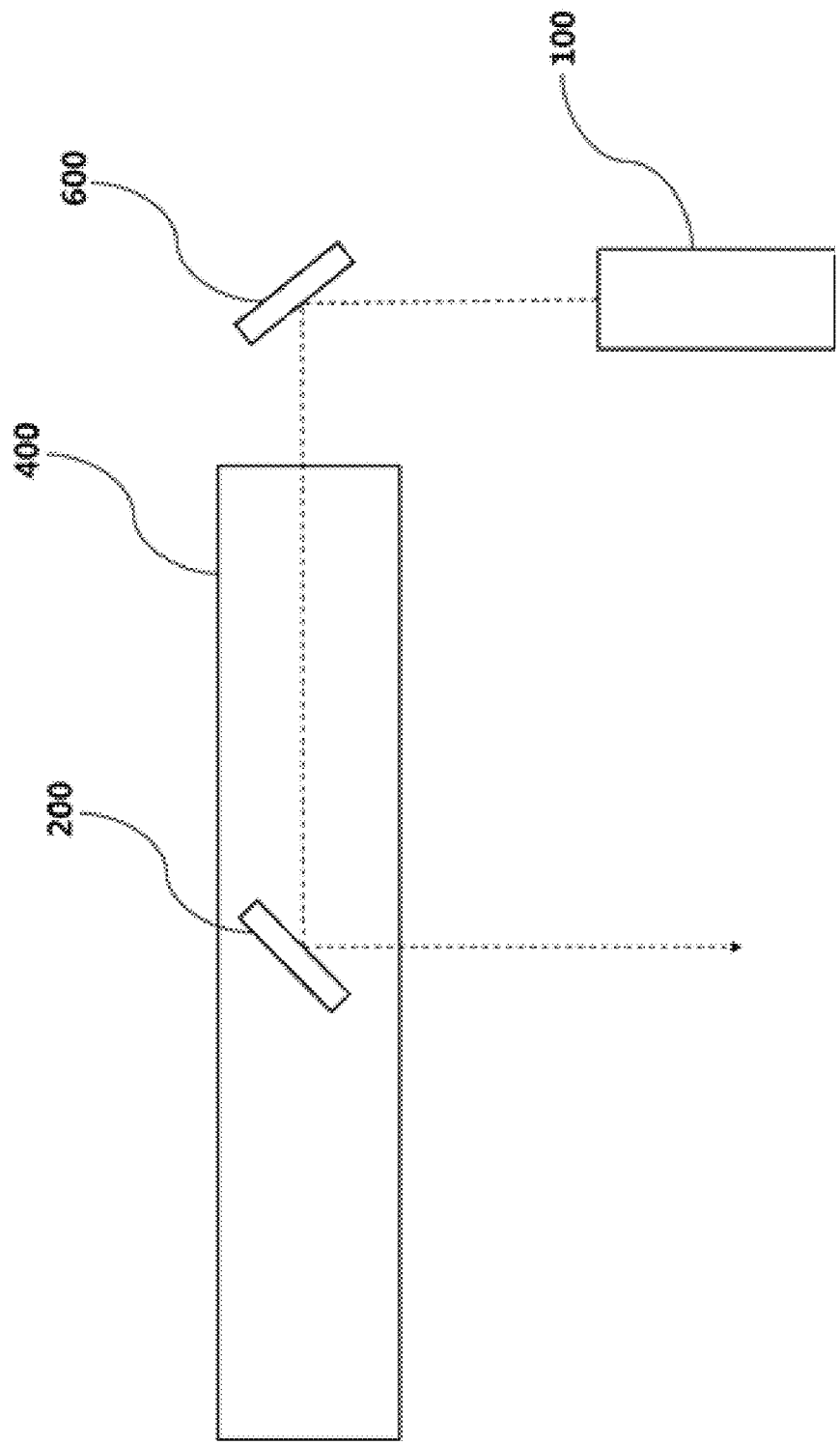
Figure 9:
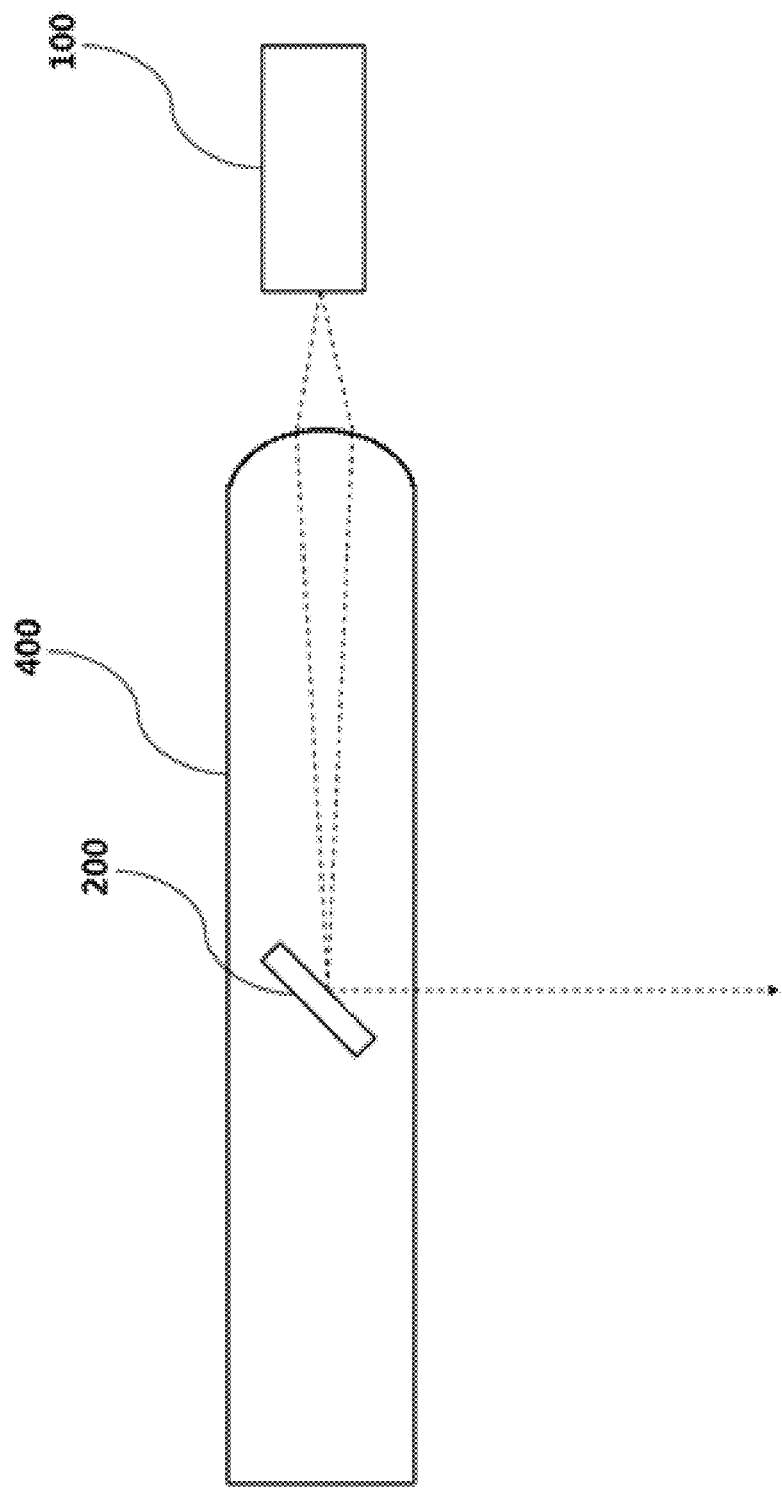

FIGS. 7 to 9 are schematic views showing the configuration of an optical apparatus according to another embodiment of the present invention. The optical apparatus according to the present invention may further include at least one of a refractive optical element 500 for refracting the image outputted from the display unit 100, a reflective optical element 600 for reflecting the image outputted from the display unit 100, and a diffractive optical element (not shown) for diffracting the image outputted from the display unit 100.

As shown in FIG. 7, the refractive optical element 500 may be interposed between the display unit 100 and the reflective unit 200. Alternatively, as shown in FIG. 8, the image outputted from the display unit 100 is reflected first by the reflective optical element 600, and the reflected image may be reflected again at the reflective unit 200.

In addition, according to the optical apparatus of the present invention, a side surface of the auxiliary optical unit 400 may be curved, so that the image outputted from the display unit 100 may be refracted at the side surface of the auxiliary optical unit 400 as shown in FIG. 9.

According to the optical apparatus of the present invention, the reflective unit 200 is miniaturized, so that the number of the display unit 100 and the available range of the arrangement may be increased, and the number of reflective unit 200 and the available range of the arrangement may be increased, which may be interpreted that the degree of freedom for the number of installation and installation position of the reflective unit 100 and the reflective unit 200 are remarkably improved.

As described above, because the AR has a technical feature of enabling the user to recognize the virtual screen superimposing on the real world, it is required to change the focal distance of the image as the user changes the focal distance while gazing at the real world so as to enable the clear image to be always recognized to the user.

The problems on the focal distance may be solved by providing an image having a deep depth of field. The depth of field refers to a range where an image (the image which the user obtains with eyes) is recognized as being in focus. Accordingly, the range recognized as being in focus is narrow when the depth of field is low, and the range recognized as being in focus is wide when the depth of field is deep. Therefore, when the image having the deep depth of field is provided to the user, a clear image may be obtained within a range where the provided image is recognized as being in focus even if the user changes the focal distance while gazing at the real world. In other words, because the range recognized as being in focus is wide when the depth of field is deep (because the focus is recognized as being in focus even if the focal distance is changed within the above range), a clear image may be obtained even if the user changes the focal distance to some extent.

Herein, when the depth of filed is infinitely deep, because the range recognized as being in focus is nearly infinite, the clear virtual screen may be obtained at any time even if the user freely adjusts the focal distance.

Because the size of the image reflected on the reflective unit 200 is smaller than the size of the pupil, the image may be accurately transferred on the retina regardless of the shape or thickness of the crystalline lens. Therefore, the user may always obtain a clear image (the image reflected on the reflective unit 200) regardless of the user's eyesight.

Considering another aspect of the reflective unit 200 having the above features, the reflective unit 200 may also serve as a factor causing a pinhole effect. FIG. 10 is a view describing the principle capable of viewing a clear image when the image is seen through a pinhole lens.

Figure 10A:
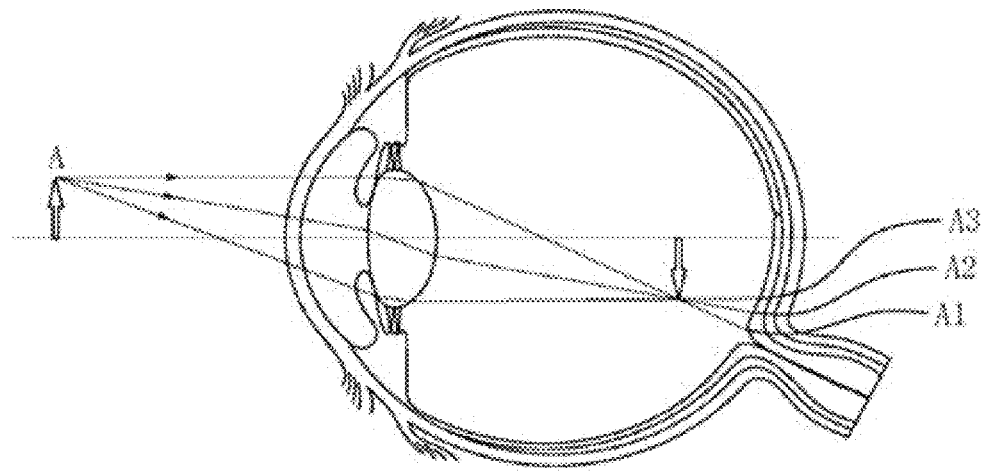
FIGS. 10A and 10B show views describing the principle capable of viewing a clear image when the image is seen through a pinhole lens.

FIG. 10A shows the reason why an object looks blurred when a near-sighted person looks at the object with naked eyes. With the nearsightedness, a focus is formed in front of the retina because of the thick crystalline lens, so that the object looks blurred because the image of the object is diffused without being focused at one point of the retina. Referring to FIG. 10A, the light A starting from the object is diffused and transferred to A1, A2, and A3 on the retina.

Figure 10B:
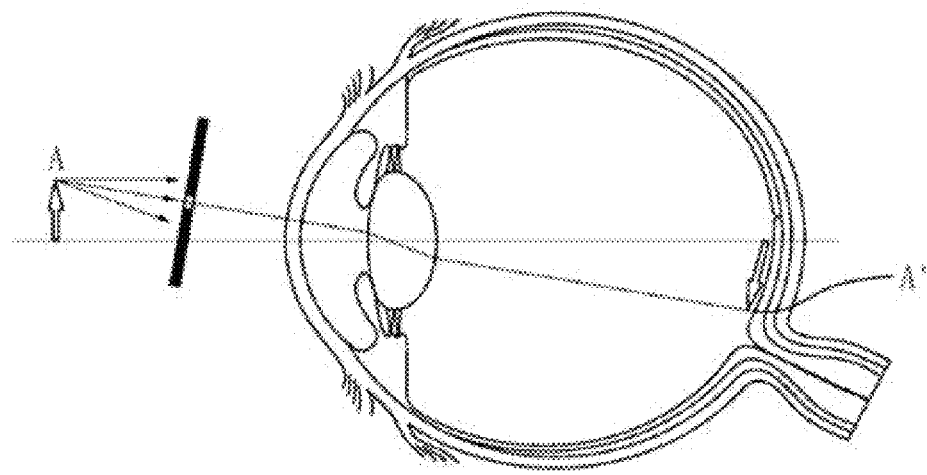

FIG. 10B shows the reason why the object looks clear when a near-sighted person wears the pinhole lens. Because the light starting from the object is limited while passing through the pinhole, and the light is transferred on a relatively narrow area of the retina, the object looks clearer comparing with the naked eyes. Referring to FIG. 10B, the light A starting from the object is transferred on the retina relatively narrowly (see A' of FIG. 10B). Only when considering the above phenomenon, the conventional problem may be solved by allowing the virtual screen outputted from the display unit 100 to pass through the pinhole to reach the eyes, however, another problem arises in the case of the pinhole. Herein, the another problem refers to the diffraction phenomenon, in which there is a limitation to form a clear image because the light passing through the pinhole is diffused. Further, due to the pinhole effect, the clearness of the image increases as the pinhole becomes smaller, however, the diffraction also increases as the pinhole becomes smaller, so there is a limitation in use of the pinhole.

Figure 11:
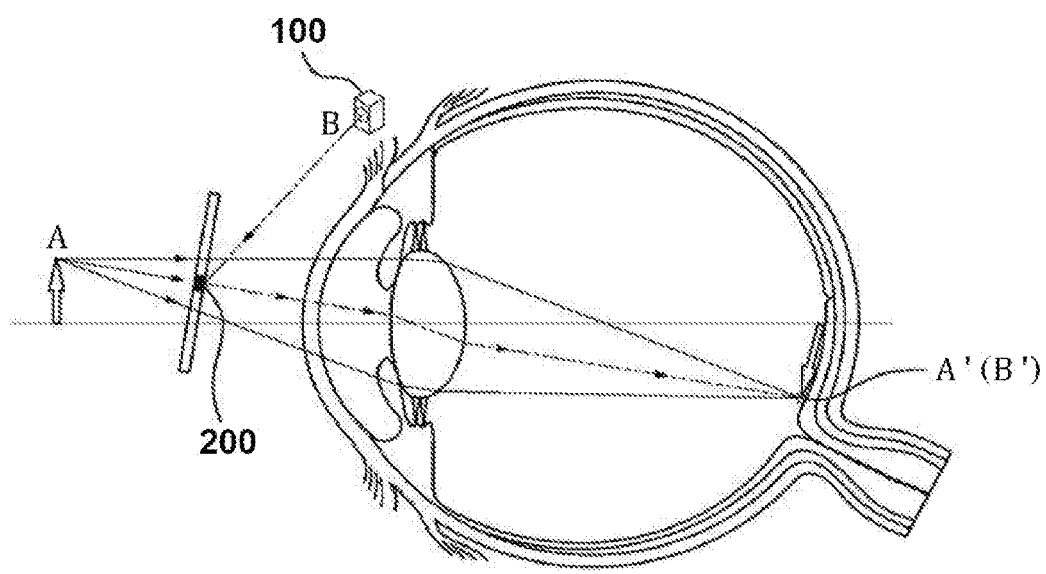
FIG. 11 is a view describing a pinhole effect of an optical apparatus according to the present invention.

In the present invention, the use of the reflective unit 200 having a small size (4 mm or less) is employed in order to prevent the a diffraction phenomenon while limiting the width of light like the pinhole. FIG. 11 is a view describing how an image of a virtual screen is transferred on the retina through an optical apparatus using a lens module for implementing a virtual reality according to the present invention. FIG. 11 shows that the light A starting from an object in the real world is transferred to A' in the retina, and the light B starting from the display unit 100 is reflected on the reflective unit 200 and then transferred to B' in the retina. In the case of FIG. 11, A' and B' are transferred to one point in the retina, so that images of the real world and the virtual image are clearly viewed without separately focusing the eyes.

Herein, the light A starting from the object may vary in position of the image transferred to the retina as the user adjusts the focal distance, because the thickness of the crystalline lens varies as the user adjusts the focal distance. However, the light B starting from the display unit 100 is always constantly transferred to B' even if the thickness of the crystalline lens is changed as the user adjusts the focal distance, so that the user may always obtain a clear virtual screen.

Accordingly, the reflective unit 200 according to the present invention has a size of 4 mm or less, so that the user may constantly obtain a clear virtual screen, which means that the depth of field of the virtual screen provided to the user is very deep.

Figure 12:
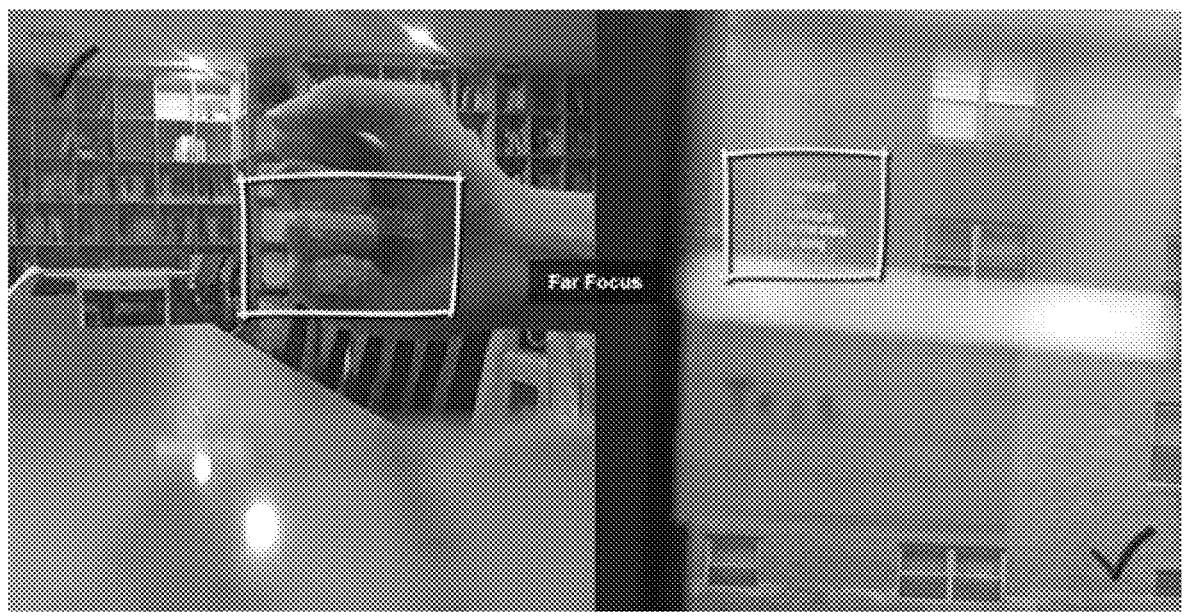
FIGS. 12 to 14 are views comparing an image obtained using an optical apparatus according to the present invention with an image obtained using the conventional optical apparatus.
Figure 13:
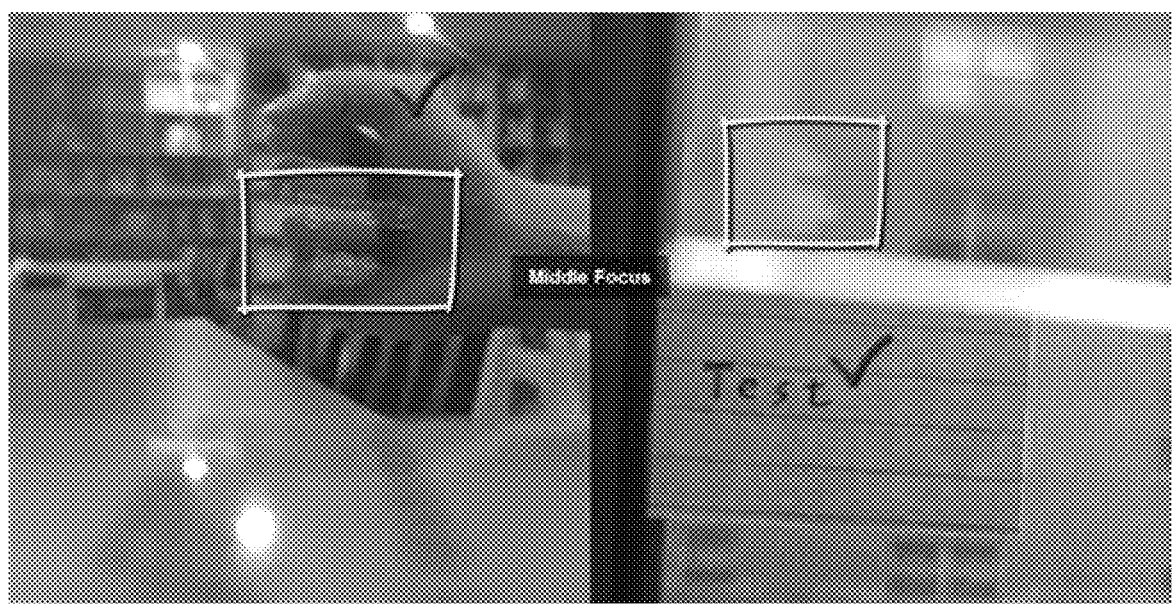
Figure 14:
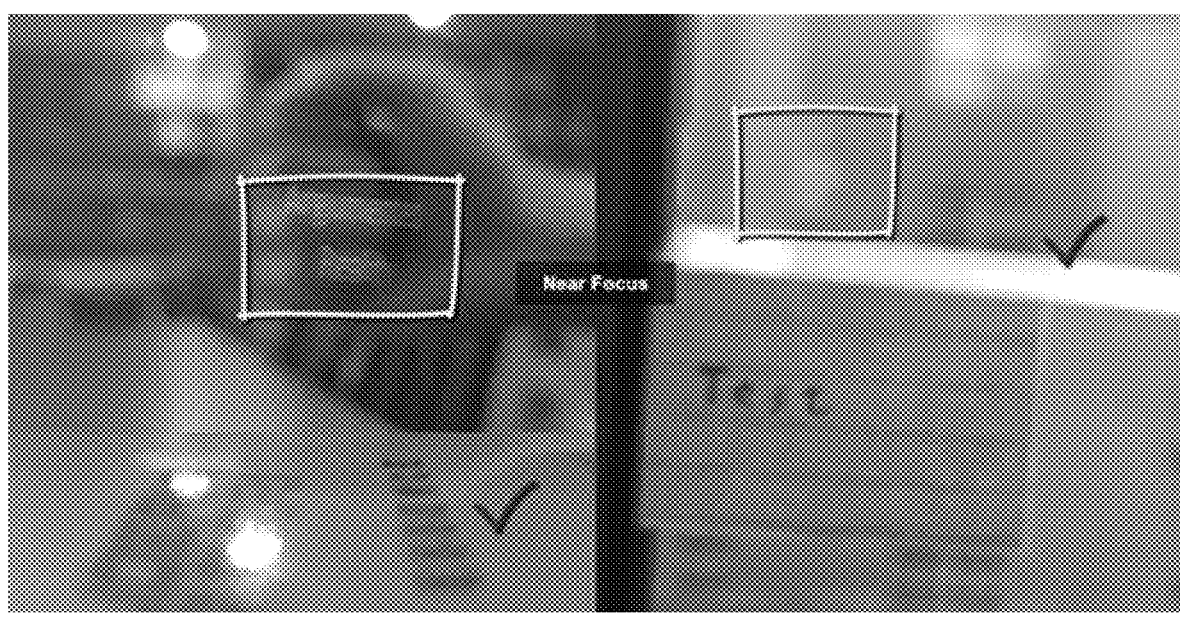

FIGS. 12 to 14 are views comparing an image obtained using an optical apparatus according to the present invention with an image obtained using the conventional optical apparatus. In FIGS. 12 to 14, left sides are images obtained using the optical apparatus according to the present invention, and right sides are images obtained using the optical apparatus where the conventional reflective lens module is used. The virtual screens outputted from the display unit 100 are displayed in the squares of FIGS. 12 to 14.

FIG. 12 shows the far focus, FIG. 13 shows the middle focus, and FIG. 14 shows the near focus. Referring to FIGS. 12 to 14, it is confirmed that the image of the real world looks clear only at a portion where the focus matches and looks blurred at a portion where the focus does not match as the focus changes from far focus, middle focus, and near focus in both of the left and right sides of the FIGS. 12 to 14.

Herein, the virtual screens in the square among the images of the right sides obtained using the conventional optical apparatus are clear only upon the far focus, and the virtual screens inside the square become blurred as the focus moves closer. On the contrary, among the images of the left sides obtained using the optical apparatus according to the present invention, the virtual screens inside the square are clear in any case that the focus is the far focus, meddle focus, or near focus.

Accordingly, the optical apparatus according to the present invention may provide a virtual screen having a deep depth of field to the user, so that a clear virtual screen may be always obtained regardless of the focal distance even if the user adjusts the focal distance when the user looks at the real world.

The above result may be obtained when the size of the reflective unit 200 according to the present invention is 2 mm or less. However, to be more effective, the size of the reflective unit 200 is preferably 50 µm to 700 µm.

In addition, the reflective unit 200 is preferably formed in a circular shape, in which it may be formed in an oval shape other than a complete circular shape if necessary. As described above, the reflective unit 200 is preferably formed in a circular or oval shape, however, it may be applied in a modified form if necessary. For example, an oval shape may be formed when the cylindrical shape is cut into an oblique line. The oval shape may not exactly match with the mathematically defined ellipse.

In other words, the reflective unit 200 of the present invention may have various shapes other than an edgeless shape, so any shape may be applicable as long as the shape achieves the object to prevent the diffraction phenomenon while achieving the above pinhole effect. For example, the shape which does not have any edge may prevent the diffraction phenomenon while achieving the pinhole effect.

In addition, the reflective unit 200 may have a curved surface, in which the curved surface may have a concave shape, or may have a convex shape if necessary.

In addition, the optical apparatus according to the present invention may be configured such that the reflective unit 200 is laminated on a base unit (not shown) formed of a hard material.

The base unit may be formed of various materials having a certain degree of hardness sufficient to laminate the reflective unit 200. A glass may be a typical example, however, various types of synthetic resins other than the glass also may be used. The reflective unit 200 may be formed of aluminum (Al) or silver (Ag) having a high reflectivity to reflect the virtual image outputted from the display unit 100, otherwise, various kinds of metals, alloys or synthetic resins also may be used. In addition, the reflective unit 200 may have a curved surface if necessary.

Although the invention has been described with the particulars such as specific components, the limited embodiments, and the drawings, the particulars are provided only to facilitate comprehensive understanding of the invention, and it is obvious to those skilled in the art that the invention is not limited to the embodiments and various changes and modifications in form and details may be made without departing from the spirit and scope of the invention.

Accordingly, the idea of the invention should not be determined by the aforementioned embodiments, and the following claims as well as all modifications or variations belonging to the equivalents of the claims will be within the scope of the invention.

What is claimed is:

1. An optical apparatus comprising:
a display unit for outputting an image;
at least one reflective unit having a diameter size of 4 mm or less which causes a pinhole effect, the reflective unit being configured to reflect the image outputted from the display unit directly to a user's eye, the at least one reflective unit having a reflectance of 100%;
a frame unit to which the display unit is fixed; and
an auxiliary optical unit fixed to the frame unit, wherein the auxiliary optical unit is a transparent optical element through which visible rays pass, an entire front surface and an entire rear surface of the transparent optical element being transparent such that a real world image is allowed to enter the transparent optical element through the entire front surface and go out of the transparent optical element through the entire rear surface, the transparent optical element having a side surface connecting and disposed between the front and rear surfaces,
wherein the at least one reflective unit is buried and installed inside the transparent optical element and entire outer peripheral surfaces of the reflective unit are surrounded by the transparent optical element,
wherein the reflective unit includes a first surface facing the front surface of the transparent optical element, a second surface opposite to the first surface and facing the rear surface of the transparent optical element, and a side surface between the first and second surfaces, the first surface being covered and in direct contact with a first transparent region of the transparent optical element, the second surface being covered and in direct contact with a second transparent region of the transparent optical element, and the side surface of the reflective unit being covered and in direct contact with a third transparent region of the transparent optical element,
wherein an end of the reflective unit closest to the front surface of the transparent optical element is spaced apart from the front surface of the transparent optical element, and an end of the reflective unit closest to the rear surface of the transparent optical element is spaced apart from the rear surface of the transparent optical element,
wherein the display unit is disposed on a side of the transparent optical element, such that the image from the display unit passes through the side surface of the transparent optical element and the second transparent region of the transparent optical element prior to reaching the second surface of the reflective unit, and the reflective unit is arranged to reflect the image from the display unit directly through the second transparent region of the transparent optical element and directly through the rear surface of the transparent optical element toward the user's eye.

2. The optical apparatus of claim 1, further comprising at least one of a refractive optical element for refracting the image outputted from the display unit, a reflective optical element for reflecting the image outputted from the display unit, and a diffractive optical element for diffracting the image outputted from the display unit.

3. The optical apparatus of claim 1, wherein a side surface of the auxiliary optical unit is curved to refract the image outputted from the display unit at the side surface of the auxiliary optical unit.

4. The optical apparatus of claim 1, wherein the at least one reflective unit is formed of a metal.

5. The optical apparatus of claim 1, wherein the at least one reflective unit is formed of an optical element.

6. The reflective lens of claim 1, wherein a surface of the at least one reflective unit is formed in a curved shape.

* * * * *